June 16, 1959

A. BRISKIE ET AL 2,890,907

EXTENDABLE HOUSE TRAILER BODY

Filed May 14, 1956

INVENTORS:
ANTHONY BRISKIE
JOHN LIMBERGER

By
THEIR ATTYS

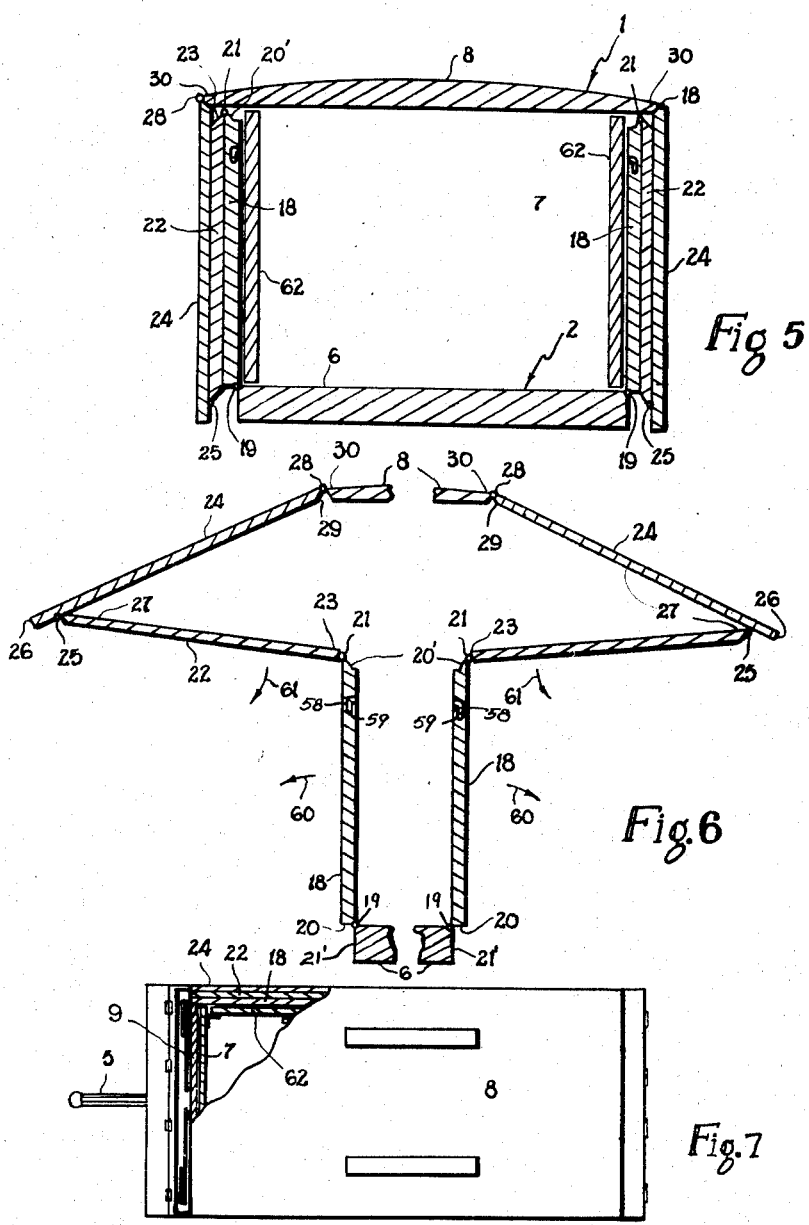

June 16, 1959 A. BRISKIE ET AL 2,890,907
EXTENDABLE HOUSE TRAILER BODY
Filed May 14, 1956 3 Sheets-Sheet 3
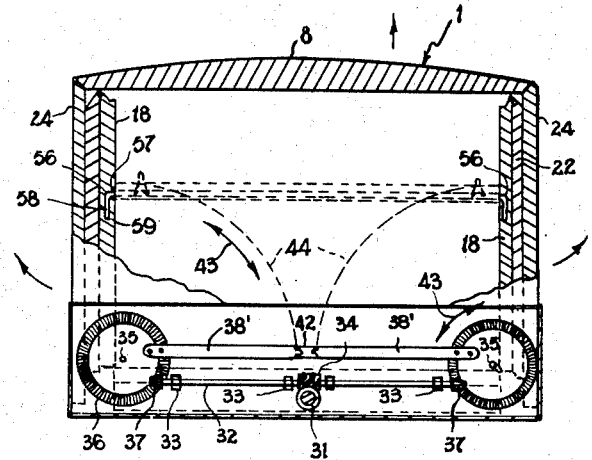
Fig. 8
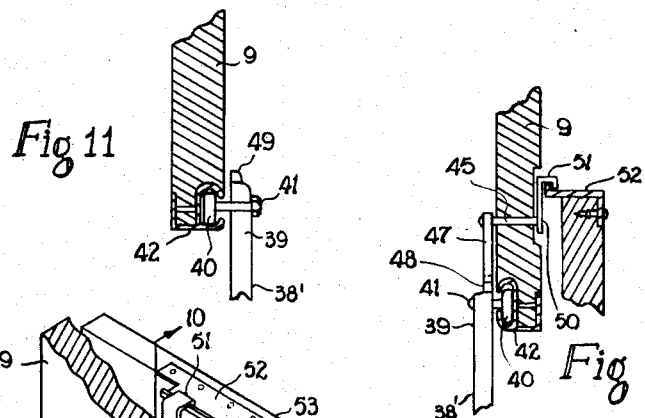
Fig 11
Fig 10
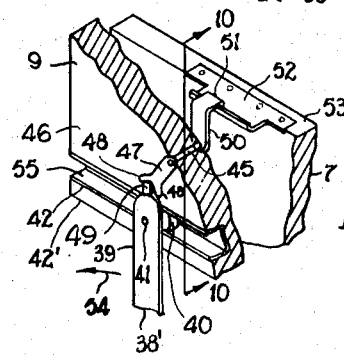
Fig. 9
INVENTORS:
ANTHONY BRISKIE
JOHN LIMBERGER
ATTYS United States Patent Office 2,890,907
Patented June 16, 1959

2,890,907
EXTENDABLE HOUSE TRAILER BODY
Anthony Briskie, North Kildonan, Manitoba, and John Limberger, Winnipeg, Manitoba, Canada Application May 14, 1956, Serial No. 584,574

12 Claims. (Cl. 296—23)

Our invention relates to new and useful improvements in extendable vehicle bodies and more primarily with trailers either adapted to be drawn behind a motor vehicle or be self-propelled.

Due to size restrictions in effect in the majority of areas, household type trailers are built extremely compactly and leave much to be desired as living quarters particularly when parked. Attempts have been made in the past to provide trailers which can be extended as to dimensions once they are off the road, but these usually suffer from the disadvantage that the extensions are difficult to operate and are not entirely satisfactory once they are in position.

We have overcome these disadvantages by providing a trailer which can be extended rapidly and easily merely by the rotation of a crank either manually or from the power take-off of the vehicle and which, when in the extended position, provides the trailer body having increased width and height dimensions and which for all intents and purposes forms an integral part of the structure.

The principal object of our invention, therefore, is to provide a device of the character herewithin described in which the width and height of the trailer can be added to once the vehicle is parked in an extremely simple manoeuvre.

A further object of our invention is to provide a device of the character herewithin described which, when in the retracted position, forms a compact, stable and otherwise satisfactory trailer structure.

With the foregoing objects in view, and such other objects and advantages as will become apparent to those skilled in the art to which this invention relates as this specification proceeds, our invention consists essentially in the arrangement and construction of parts all as hereinafter more particularly described, reference being had to the accompanying drawings in which:

Figure 5 is a cross-sectional view of the trailer body per se in the folded position.

Figure 6 is a view similar to Figure 5, but showing just the side floor panels, side wall panels, and roof wing panels, in the partially extended position.

Figure 7 is a top plan view of my device shown in the retracted position and fragmentary in part to show the interior thereof.

Figure 8 is an end elevation of my device fragmentary in part to show the interior thereof.

Figure 9 is an enlarged fragmentary perspective view showing the locking assembly in the locked position between the end panels of the upper and lower body portions.

Figure 10 is a section view substantially along the lines 10—10 of Figure 9.

Figure 11 is an enlarged fragmentary view of one end of one of the crank arms engageable within the end wall of the upper body portion.

In the drawings like characters of reference indicate corresponding parts in the different figures.

Figure 1:
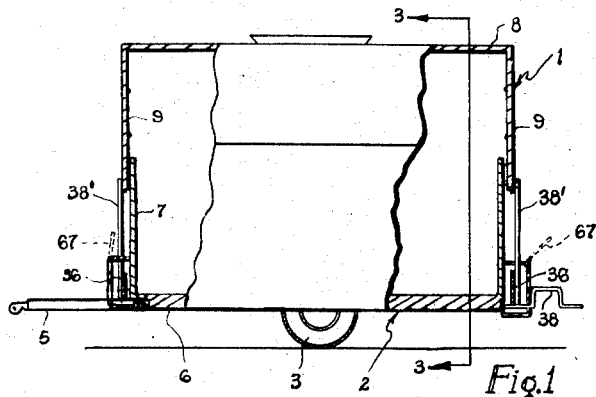
Figure 1 is a side elevation of our trailer in the extended position and fragmentary in part to show the interior thereof.
Figure 2:
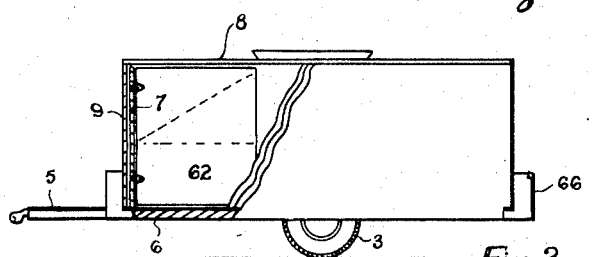
Figure 2 is a view similar to Figure 1, but showing the device in the retracted position.

Proceeding now to describe our invention in detail, it will be seen upon reference to the accompanying drawings that it consists primarily of an upper body portion collectively designated 1 and a lower body portion collectively designated 2 mounted upon ground engaging wheels 3 supported by axle 4 and including a towing hitch assembly 5 by which the vehicle may be towed behind any convenient source of power.

The lower body portion 2 includes a substantially rectangular central floor panel 6 having upwardly extending end walls 7 secured to each end of the floor panel 6.

The upper body portion 1 includes a substantially rectangular roof panel 8 and downwardly extending end panels 9 secured to the ends of the roof panel, all of which are clearly shown in Figure 1.

Figure 4:
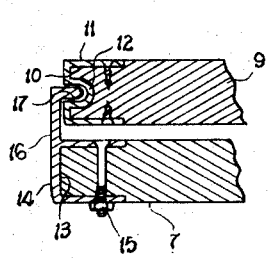
Figure 4 is a fragmentary horizontal sectional view enlarged with respect to the other views, showing the engagement of one of the end panels of the upper body portion with the end panels of the lower body portion.

The upper body portion 1 is adapted to engage over the lower body portion 2, the end panels 9 sliding over the end panels 7 and means are provided to effect this vertical sliding engagement and are shown in detail in Figure 4.

On the vertical side edges 10 of the upper body portion end panels 9 are situated vertical channels 11 formed preferably of sheet metal and adapted to embrace the side edges 10 and to be recessed therein to form the actual channel 12. On the vertical side edges 13 of the end panels 7 of the lower body portion, we provide a U-shaped vertically extending component 14 secured by means 15 and having an extending flange 16 extending towards the end panels 9. This flange is provided with a strip 17 extending inwardly at right angles and adapted to engage within the channel 12 of the end walls 9 as clearly shown so that the upper body portion can reciprocate vertically with relation to the lower body portion due to this sliding engagement hereinabove described.

A substantially rectangular side floor panel 18 is hingedly secured as at 19, by the longitudinal edge 20 thereof to each longitudinal edge 21' of the aforementioned central floor panel 6 as clearly illustrated in Figure 6, and to the other longitudinal edges 20' of the side floor panels 18, we have hingedly secured as at 21, substantially rectangular side wall panels 22 by longitudinal edges 23 thereof.

Substantially rectangular roof wing panels 24 are hingedly secured as at 25 adjacent the longitudinal edges 26 thereof to the other longitudinal edges 27 of the aforementioned side wall panels 22 and these wing panels 24 are again hingedly connected as at 28 by the other longitudinal edges 29 thereof to the side longitudinal edges 30 of the aforementioned roof panel 8, thus making a structure which can be folded inwardly or outwardly as will hereinafter be described.

Means are provided to raise and lower the upper body portion 1 with relation to the lower body portion 2 and at the same time extend and retract the side floor panels 18, the side wall panels 22, and the roof wing panels 24, and reference to Figure 8 will show a main shaft 31 situated adjacent the central floor panel 6 and supported in bearings (not illustrated) thereon, said main shaft lying substantially along the longitudinal axis of the floor panel 6 and extending from end to end thereof. Upon the aforementioned end panel 7 of the lower body portion are mounted transversely extending cross shafts 32 journalled for rotation within bearings 33 and having gear means 34 extending between the main shaft 31 and the transverse cross shafts 32. Also journalled for rotation upon shafts 35 secured to the end wall panels 7 are relatively large gears 36 there being 2 such gears upon each end wall panels 7 as clearly shown and gear means 37 are secured to the extremities of the cross shaft 32 engageable with the aforementioned gears 36.

From the aforementioned description it will be appreciated that a crank 38 engageable with one end of main shaft 31 will rotate gears 36 simultaneously. A crank arm 38' is secured by one end thereof to the face of each of the gears 36, said crank arm extending inwardly towards the longitudinal axis of the vehicle and lying substantially horizontally thereto when the upper body portion is in the lowermost position as illustrated in Figure 8 and upon the other end 39 of the crank arm, we provide a roller 40 journalled for rotation upon pin 41.

A channel 42 is formed within the end walls 9 of the upper body portion adjacent and horizontal to the lower edges 42' thereof and the aforementioned rollers 40 are adapted to engage this horizontal channel as shown in Figure 9.

From the foregoing it will be appreciated that rotation of the main shaft 31 will cause the crank arms 38' to move in the direction of the double pointed arrows 43 so that the ends carrying the roller 40 will describe the arc indicated by dotted line 44 and as they are in engagement with the channel 42, it will be apparent that the upper body portion will be raised or lowered vertically in relation to the lower body portion 1.

When the upper body portion is in the uppermost position as illustrated in Figures 1, 3, 9 and 10, it will be apparent that means are required to maintain the upper body portion in this position, but particularly in view of the fact that the crank arms then continue onwardly to unfold the remainder of the side structure, as will hereinafter be described. We, therefore, provide a pivot pin 45 extending through the end panels 9 of the upper body portion adjacent to the lower corners 46 thereof and upon the outer end of this pivot pin is provided an escapement lever 47 including the gears 48 as shown in Figure 9. This escapement lever 47 is adapted to be engaged by a projection 49 formed upon the extremities of the crank arms 38', which engagemment rocks the escapement lever and hence partially rotates pivot pin 45, it being understood that the projection 49 can continue on after rocking the escapement lever.

Upon the opposite end of pivot pin 45 is provided a catch lever 50 having an engaging flange 51 upon one end thereof, said catch lever also being rotated by the movement of the pin 45 so that the flange portion 51 comes into engagement with a catch plate 52 secured to the upper edge 53 of the end walls 7 of the lower body portion.

In Figure 9 the upper end 39 of the crank arm 38' is moving in the direction of the arrow 54 and has locked the upper body portion to the lower body portion as illustrated. It will also be noted that the crank arm 38' is in the substantially vertical position having travelled to approximately 90° from the position shown in Figure 8.

After locking the two sections together as hereinbefore described, further rotation of the main shaft 31 causes the crank arm to move through a further 90° and in doing so, of course, the rollers 40 disengage from the ends 55 of the aforementioned channels 42 and engage within angulated recesses 56 formed within the side floor panels 18 substantially adjacent to the longitudinal edge 20 thereof. These recesses comprise the open ended portion 57 and the locking portion 58 so that the rollers, after leaving the channel 42, terminate at the lower end 59 of the recesses. Further movement of the crank arms will then apply pressure to the side floor panels 18 and move same in the direction of arrows 60, from the vertical position shown in Figure 6 to the horizontal position shown in Figure 3 at which time the crank arms 38' will then have passed through substantially 180° and again lie substantially horizontal to the floor panels.

Figure 3:
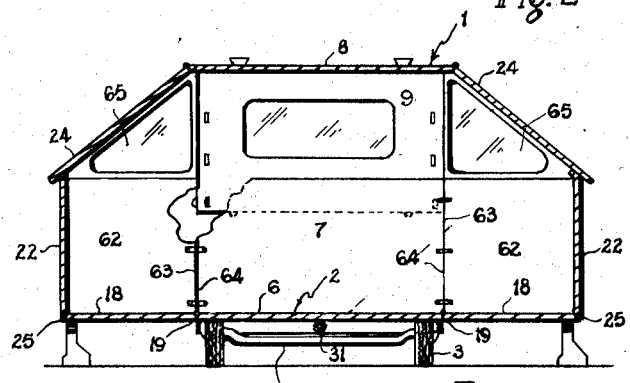
Figure 3 is a section substantially along the lines 3—3 of Figure 1.

In moving the side floor panels 18 to the horizontal position, the hinge attachment thereof also moves the side wall panels 22 in the direction of arrows 61 until they take up the vertical position illustrated in Figure 3 in which the trailer is shown in the fully extended position.

The reverse rotation of main shaft 31 will, of course, first lift the side floor panels 18 and the side wall panels 22 to the position shown in Figure 6 and further rotation will cause the rollers 40 to ride up out of the recesses 56 and engage the channels 42 and travel therealong, unlocking the catch 51 from the catch plate 52 and then lowering the upper body portion downwardly to take up the position shown in Figure 5.

When in the extended position shown in Figure 3, end wing panels 62 which are hinged by edges 63 to the side edges 64 of the end wall 7, may be opened out to the position shown in Figure 3 whereupon triangular window-like panels 65 may be inserted to close the ends 66, it being understood that the panels 65 can be detached and attached by conventional means such as turnbuckles (not illustrated).

However, when it is necessary to retract the assembly, the triangular window panels 65 are removed and stored within the interior of the trailer, whereupon the panels 62 are swung inwardly to lie parallel to the longitudinal side edges 21 of the central floor panel 6 after which the structure can be lowered as hereinafter described.

It will be appreciated that the raising of the upper body portion 1 by the movement of the crank arms 38' to approximately 90° causes the side floor panels 18, the side wall panels 22 and the roof wing panel 24 to take up the position shown in Figure 6 and that the further movement of the crank arm 38 through a further 90°, unfold these hinged panels to the position shown in Figure 3.

Finally, we have provided covers 66 to enclose the crank arms and gears when in the lowermost position, hinged lids 67 being provided to allow passage of the crank arm when the structure is raised.

Since various modifications can be made in our invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What we claim as our invention is:

1. An extendable and retractable vehicle body adapted to be supported on ground engaging wheels, comprising in combination a lower body portion and an upper body portion, said lower body portion including a central floor panel and an end panel extending upwardly from each end of said central floor panel, said upper body portion including a roof panel and an end panel extending downwardly from each end of said roof panel, means cooperating between said roof end panels and said floor end panels, whereby said upper body portion is adapted to slide vertically with relation to said lower body portion within limits, a side floor panel hingedly secured by one longitudinal edge thereof to each of the longitudinal edges of said central floor panel, a side wall panel hingedly secured by the lower longitudinal edge thereof to the other longitudinal edge of each of said side floor panels, and a roof wing panel hingedly secured by one longitudinal edge thereof to the other longitudinal edge of each of said side wall panels and by the other longitudinal edge thereof to the longitudinal edges of said roof panel, said side floor panels, said side wall panels, and said roof wing panels adapted to nest in side by side relationship when said upper body portion is in the lowermost position and to extend and fold outwardly when said upper body portion is in the uppermost position, and means to raise and lower said upper body portion with relation to said lower body portion, said means co-operating between said roof end panels and said floor end panels including a vertical channel formed in each of the vertical side edges of one pair of said end panels and channel engaging means extending from the vertical side edges of the other pair of said end panels.

2. An extendable and retractable vehicle body adapted to be supported on ground engaging wheels, comprising in combination a lower body portion and an upper body portion, said lower body portion including a central floor panel and an end panel extending upwardly from each end of said central floor panel, said upper body portion including a roof panel and an end panel extending downwardly from each end of said roof panel, means co-operating between said roof end panels and said floor end panels, whereby said upper body portion is adapted to slide vertically with relation to said lower body portion within limits, a side floor panel hingedly secured by one longitudinal edge thereof to each of the longitudinal edges of said central floor panel, a side wall panel hingedly secured by the lower longitudinal edge thereof to the other longitudinal edge of each of said side floor panels, and a roof wing panel hingedly secured by one longitudinal edge thereof to the other longitudinal edge of each of said side wall panels and by the other longitudinal edge thereof to the longitudinal edges of said roof panel, said side floor panels, and side wall panels, and said roof wing panels adapted to nest in side by side relationship when said upper body portion is in the lowermost position and to extend and fold outwardly when said upper body portion is in the uppermost position, and means to raise and lower said upper body portion with relation to said lower body portion, said means to raise and lower said upper body portion including a pair of gears journalled for rotation upon each of said end panels of said lower body portion, a crank arm secured to and extending from the face of each of said gears, said crank arms extending inwardly and lying substantially horizontally when said upper body portion is in the lowermost position, a substantially horizontal channel formed in each of said end panels of said upper body portion substantially adjacent the lower edges thereof, means on the extremities of said crank arm engageable within said channels, means to rotate said gears simultaneously thereby rotating crank arms, means co-operating between the end panels of said upper and lower body portions adapted to be actuated by said crank arms to lock selectively said upper body portion in the uppermost position and means engageable by the extremities of said crank arms, on said side floor panels, adapted to open and close said side floor panels, said side wall panels, and said roof wing panels.

3. The device according to claim 2 in which said means on the extremities of said crank arms includes a roller journalled for rotation thereon, said roller engageable within said channels.

4. The device according to claim 2 in which said means to rotate said gears simultaneously includes a main shaft journalled for rotation below said central floor panel and extending longitudinally from end to end thereof, a transversely extending shaft journalled for rotation upon each of said end panels of said lower body portion, gear means connecting said transversely extending shaft to said main shaft, and gear means on the outer ends of said transversely extending shaft engageable with said crank arm gears, the rotation of said main shaft actuating said crank arm.

5. The device according to claim 2 in which said means co-operating between end panels of said upper and lower body portions includes a pivot pin extending through said end panels of said upper body portion superjacent said channels, an escapement lever on one end of said pin engageable and rockable by the extremities of said crank arm, a catch lever on the other end of said pin, and a catch lever plate on the upper edge of one said end panels of said lower body portion engageable by said catch lever.

6. The device according to claim 2 in which said means engageable by the extremities of said crank arm on said side floor panel includes an angulated recess formed in the side edges of said side floor panels, said means on the extremities of said crank arm adapted to disengage from the ends of said channels on said end panels of said upper body portion, and engage within said angulated recesses when said upper body portion is in the uppermost position.

7. The device according to claim 3 in which said means to rotate said gears simultaneously includes a main shaft journalled for rotation below said central floor panel and extending longitudinally from end to end thereof, a transversely extending shaft journalled for rotation upon each of said end panels of said lower body portion, gear means connecting said transversely extending shaft to said main shaft, and gear means on the outer ends of said transversely extending shaft engageable with said crank arm gears, the rotation of said main shaft actuating said crank arm.

8. The device according to claim 3 in which said means co-operating between end panels of said upper and lower body portions includes a pivot pin extending through said end panels of said upper body portion superjacent said channels, an escapement lever on one end of said pin engageable and rockable by the extremities of said crank arm, a catch lever on the other end of said pin, and a catch lever plate on the upper edge of one said end panels of said lower body portion engageable by said catch lever.

9. The device according to claim 3 in which said means engageable by the extremities of said crank arm on said side floor panel includes an angulated recess formed in the side edges of said side floor panels, said means on the extremities of said crank arm adapted to disengage from the ends of said channels on said end panels of said upper body portion, and engage within said angulated recesses when said upper body portion is in the uppermost position.

10. The device according to claim 4 in which said means co-operating between end panels of said upper and lower body portions includes a pivot pin extending through said end panels of said upper body portion superjacent said channels, an escapement lever on one end of said pin engageable and rockable by the extremities of said crank arm, a catch lever on the other end of said pin, and a catch lever plate on the upper edge of one said end panels of said lower body portion engageable by said catch lever.

11. The device according to claim 4 in which said means engageable by the extremities of said crank arm on said side floor panel includes an angulated recess formed in the side edges of said side floor panels, said means on the extremities of said crank arm adapted to disengage from the ends of said channels on said end panels of said upper body portion, and engage within said angulated recesses when said upper body portion is in the uppermost position.

12. The device according to claim 5 in which said means engageable by the extremities of said crank arm on said side floor panel includes an angulated recess formed in the side edges of said side floor panels, said means on the extremities of said crank arm adapted to disengage from the ends of said channels on said end panels of said upper body portion, and engage within said angulated recesses when said upper body portion is in the uppermost position.

References Cited in the file of this patent

UNITED STATES PATENTS

| | | | |
|---|---|---|---|
| 1,386,943 | Moore | Aug. 9, 1921 |
| 1,431,783 | Diffenderfer | Oct. 10, 1922 |
| 1,734,803 | Gable | Nov. 5, 1929 |
| 1,857,081 | Fontaine | May 3, 1932 |
| 1,917,824 | Burns | July 11, 1933 |
| 2,155,582 | Bond | Apr. 25, 1939 |